March 10, 1953
A. L. ENGLISH
2,631,005
NOZZLE STRUCTURE FOR ELASTIC FLUID TURBINES
Filed April 3, 1952
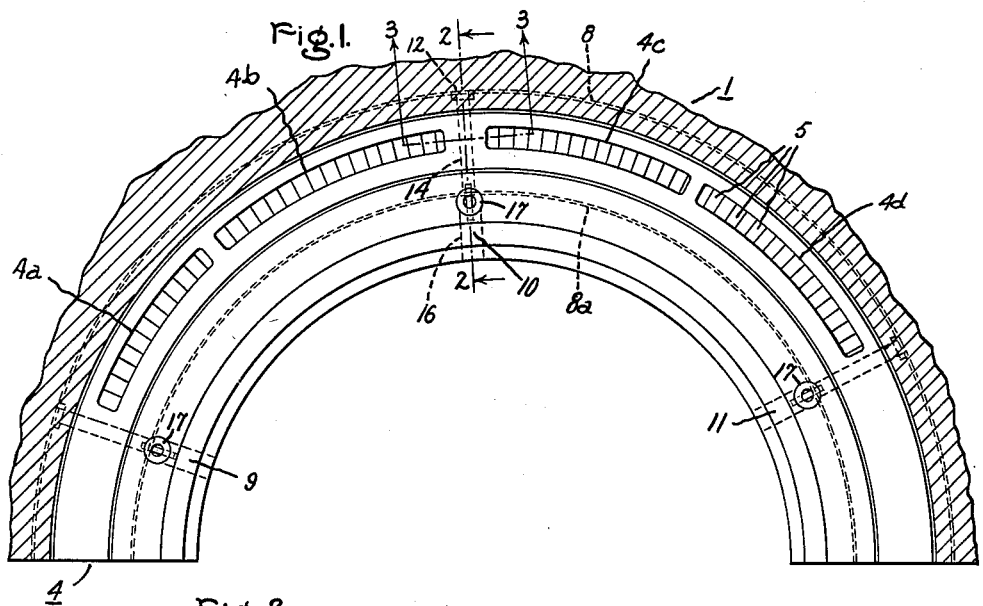
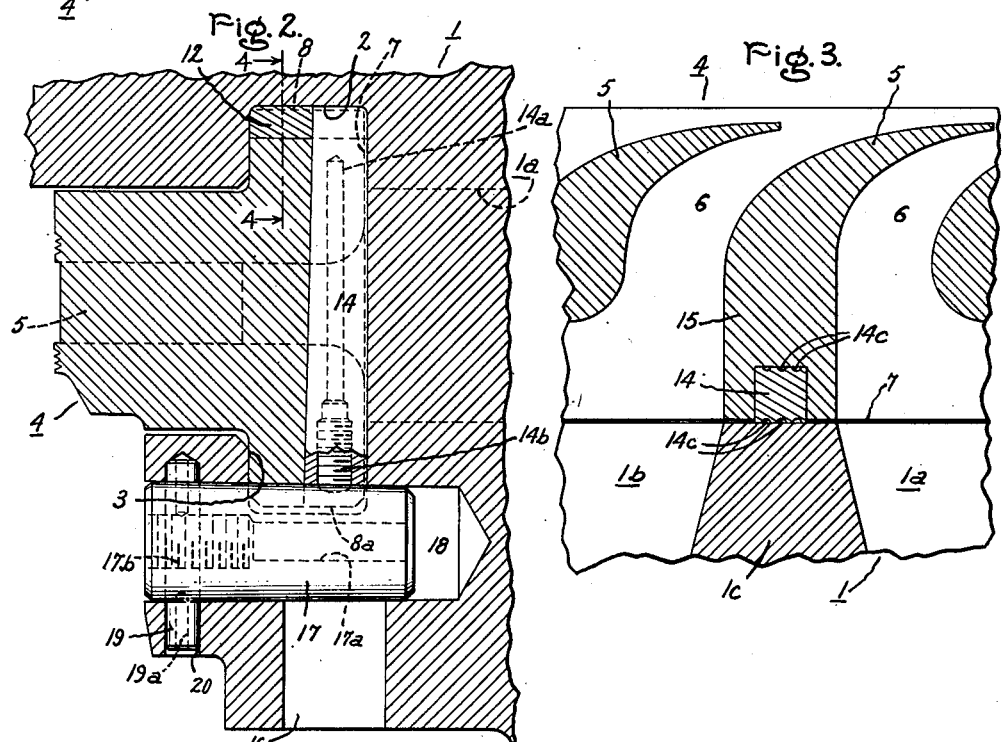
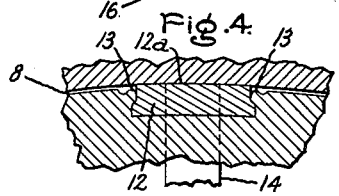
Inventor:
Alexander L. English,
by Richard E. Hosley
His Attorney.

Patented Mar. 10, 1953

2,631,005

UNITED STATES PATENT OFFICE 2,631,005

NOZZLE STRUCTURE FOR ELASTIC FLUID TURBINES

Alexander L. English, Schenectady, N. Y., assignor to General Electric Company, a corporation of New York Application April 3, 1952, Serial No. 280,319

5 Claims. (Cl. 253—78)

This invention relates to elastic fluid turbines, particularly to an improved arrangement for securing in the turbine casing the arcuate nozzle plate member for directing jets of motive fluid into the moving buckets.

Heretofore, it has been customary to form the nozzles of a steam turbine in an arcuate plate member secured to the motive fluid inlet casing by a substantial number of bolts. With steam conditions in excess of 2,000 lbs./sq. in. pressure and above 1,000° F. temperature, such bolts are subject to "creep" effects because of the high temperatures and extreme loadings, with the result that the bolts relax slightly and permit leakage between casing and nozzle plate, which of course seriously depreciates the thermal efficiency of the turbine. A turbine nozzle arrangement of this general type is shown for instance, in the United States patent to D. F. Warner—2,275,830, issued March 10, 1942, and assigned to the same assignee as the present application. In some turbines, only the inner peripheral portion of the nozzle plate is secured by bolts to the steam inlet chest, while the outer periphery is retained in a groove in the casing by means of an arcuate calking strip peened into the groove against the peripheral side face of the nozzle plate. Such structure is shown as an incidental feature in the patent to J. F. Jefferson—2,388,975, issued November 13, 1945, and also assigned to the same assignee. When nozzle arrangements of these general types are used with extremely high steam pressures and temperatures, crushing of the calking strip and/or stretching of the bolts may actually result in failure of bolts or calking strips, with the result that small broken pieces go through the turbine and cause extensive damage to the moving bucket-wheels. Such failures must of course be absolutely prevented if still higher temperatures and pressures are to become feasible for turbines in large utility generating plants.

Accordingly, the object of the present invention is to provide an improved arrangement for supporting an arcuate nozzle plate in a high pressure, high temperature steam turbine casing, which employs no bolts or similar small securing parts subject to failure and entry into the motive fluid flow path.

A further object is to provide an improved nozzle plate securing arrangement specially adapted for use in connection with steam turbines having a plurality of separately controlled steam inlet chests with special seal means for preventing leakage of steam from one nozzle arc to an adjacent inactive arc.

Other objects and advantages will become apparent from the following description taken in connection with the accompanying drawings, in which Figure 1 is a partial view in elevation of a nozzle plate arranged in accordance with the invention, Figure 2 is a sectional view showing the means for securing and sealing the nozzle plate in the casing, taken on the plane 2—2 in Figure 1, Figure 3 is a detail sectional view taken on the plane 3—3 in Figure 1, and Figure 4 is a detail section taken on the plane 4—4 in Figure 2.

Generally, the invention is practiced by securing both the inner and outer periphery of the arcuate nozzle plate in arcuate grooves formed in the turbine casing, by key means which serve the dual function of holding the nozzle plate tightly in place and preventing cross-leakage of motive fluid between the respective nozzle arcs.

Referring now more particularly to Figure 1, the invention is illustrated as applied to a turbine having a casing only an arcuate portion of which is shown at 1. As may be seen better in Figure 2, the casing 1 defines a pair of concentric radially spaced grooves 2, 3 adapted to receive the outer and inner peripheral portions respectively of the nozzle plate member shown generally at 4.

The nozzle plate 4 itself may be fabricated in any of many known ways, as for instance by welding, and it need only be noted here that the nozzle plate has a central arcuate portion defining a plurality of nozzle arcs 4a, 4b, 4c, 4d, each having a plurality of radially extending nozzle blades 5, the cross-section shape of which may be seen in Figure 3. It will be appreciated that adjacent blades 5 define streamlined nozzle passages 6 for directing the motive fluid at appropriate directions and velocities into the moving buckets (not shown). As is common in the steam turbine art, the casing 1 is made as upper and lower half casings, divided along a horizontal plane through the axis of the rotor, the two casing halves being secured together by various bolting arrangements the details of which need not be noted here. It is important to observe that the divided casing arrangement makes possible my improved nozzle plate construction, since, as will be apparent from Figure 2, the only way to install the nozzle plate 4 is by sliding it in a circumferential direction into place in casing 1 from the open ends of the grooves 2, 3 at the dividing plane between casing halves. This operation is known in the turbine shops as "rolling" the nozzle plate into the casing.

This "rolled in" construction is extremely desirable in very high pressure turbines because of its freedom from bolts which have to take the full force of the steam in the inlet chamber acting against the nozzle plate. Unfortunately, with the nozzle arrangements known to the prior art, it has not been considered feasible to use the "rolled in" type of nozzle plate with large turbines having subdivided steam inlet chests supplying separate arcs of nozzles, because of the problem of preventing cross-leakage, when operating at part loads, from an active nozzle arc to an adjacent inactive arc. The turbine shown in the accompanying drawings is provided with two separate steam inlet chambers in each half of the casing. Specifically, the nozzle arcs 4a, 4b communicate with a common steam inlet chamber, while the other arcs 4c, 4d communicate with a separate steam inlet chamber, the motive fluid being admitted to these inlet chambers separately or simultaneously by the action of suitable valve mechanism (not shown). Such multivalved inlet arrangements have become common in the steam turbine art, as disclosed for instance in the United States patent to Warren—2,379,770, issued July 3, 1945, and assigned to the same assignee as the present application.

In Figure 2, the steam inlet chamber for the nozzle arcs 4a, 4b is indicated in dotted lines at 1a, and in Figure 3 the casing portion 1c separates the inlet chamber 1a from the adjacent chamber 1b. The adjacent nozzle blade 5 is provided with an extended portion 15 which subdivides the nozzle arc into portions corresponding to the inlet chambers. With such an arrangement, it will be apparent that, if the turbine valve mechanism be actuated to admit motive fluid only to the chamber 1a, as will be the case when the turbine is operating lightly loaded, there will be a substantial leakage path for motive fluid through the clearance space 7 defined between the nozzle plate member 4 and the abutting surfaces of the casing 1. For reasons of manufacturing economy, this axial clearance space 7 between nozzle plate and casing must be made of substantial size, perhaps on the order of .010 to .020 inch in view of the very large size of such turbine casings and the manufacturing tolerances feasible with the large machine tools required to handle such large casings. This axial clearance space 7 is also indicated in dotted lines in Figure 2. As also seen in Figure 2, there is a radial clearance shown in dotted lines at 8. This radial clearance between nozzle plate and casing is also required for manufacturing reasons.

These substantial clearance spaces would form leakage paths between adjacent nozzle arcs which would render the construction wholly impracticable, because of the substantial depreciation in thermal efficiency which would occur at light loads, unless special means are provided to absolutely prevent such cross-leakage between nozzle arcs. In addition to preventing this leakage, it is of course also necessary to provide some means for mechanically securing the nozzle plate tightly in the over-sized grooves 2, 3. These sealing and securing functions are performed by the key means now to be described.

This key structure is illustrated in the detail sectional views of Figures 2, 3, and 4, and it is to be understood that this key construction is duplicated at the locations identified 9, 10, and 11 in Figure 1.

The means for preventing leakage through the circumferential clearance space 8 comprises a transversely extending key 12 secured in a groove in the outer periphery of nozzle plate 4, as for instance by peening the adjacent portions of the nozzle plate rim as shown at 13 in Fig. 4. In assembly, after the circumferential surfaces of the nozzle plate 4 have been turned on a lathe, the circumferentially spaced transverse grooves are milled for receiving the keys 12, after which the keys are peened in place as shown in Figure 4. The two mating halves of the nozzle ring are then clamped together for machining the outer circumferential surface of the keys 12 to the exact inner dimensions of the casing groove 2. Then when the separate nozzle plate members are "rolled into" the casing grooves 2, 3, the outer circumferential surfaces 12a of the keys 12 will sealingly engage the wall of the groove 2.

The means for preventing circumferential leakage between the nozzle inlet casing wall 1c and the nozzle plate member comprises the radially extending key members 14. As will be understood by reference to Figures 2 and 3, each key 14 is disposed in a radial keyway of square cross section machined, after installation of the keys 12, in the nozzle plate wall portion 15 which separates the adjacent nozzle passages 6 (Figure 3). It will be apparent that key 14 constitutes a dam preventing circumferential leakage through the clearance space 7 between the inlet chambers 1a, 1b. To effectively perform this sealing function, it is necessary that the keys 14 be very carefully fitted. To this end, each key is somewhat tapered along its length and is carefully matched with the nozzle plate and casing with which it is to be used so that the tapered side walls of the key sealingly abut the keyway of the nozzle plate wall portion 15 and the adjacent surface of the nozzle inlet chamber wall 1c at the same time that the radially outer end of the key sealingly engages the walls of groove 2. This fitting process is effected by way of generously proportioned access holes indicated at 16 in Fig. 2. Actually, the tapered keys 14 are originally made of sufficient length as to project radially inwardly through the access holes 16 to facilitate the repeated inserting and removal of the key, as required in the fitting process. The class of fit is made such that the tapered key will provide a fairly tight drive fit when installed as shown in Figure 2. It will be obvious that the slight taper of the key results in the nozzle plate 4 being securely held against the forward radial walls of the grooves 2, 3.

It remains to provide means for insuring that the keys 14 will not loosen, and to prevent circumferential leakage through the arcuate clearance space identified 8a in Figures 1 and 2. This sealing and retaining function is performed by tapered dowel pins 17, each of which is carefully fitted to a drilled and reamed hole in the casing, identified 18 in Figure 2. As will be apparent from Figures 1 and 2, the hole 18 intersects the access hole 16. Hole 18 is, of course, drilled and reamed after the key 14 is installed, which operation serves to cut off the protruding end portion of the key 14, and at the same time provides a perfect fit between the surface of the dowel pin 17 and the adjacent cut surface of the key 14 and nozzle plate 4. The taper of the dowel pin insures that the nozzle plate 4 is held tightly out against the outer wall of casing groove 2.

The dowel pin 17 is in turn retained against accidental loosening by a radially extending retainer pin 19. This pin is conveniently assembled by drilling a radial hole 20 into the casing and through the end portion of dowel 17.

Attention is particularly directed to the fact that the retaining and sealing means at each of the locations 9, 10, 11 comprises only the rim sealing key 12, the radial sealing key 14, the dowel pin 17, and the retainer pin 19. It is important to note that none of these small sealing and retaining members have direct access to the motive fluid flow path. In other words, these small parts are all enclosed in recesses in the nozzle plate and casing respectively. Thus, they are substantially protected from contact with the motive fluid; and, if they should fail, no broken fragment could get into the motive fluid flow path and cause damage to the rotor. Actually, the forces on these small retaining and sealing parts are not sufficiently great as to produce failures which might result in small loose fragments, since the principal loading, due to steam inlet pressure acting on the nozzle plate, is taken by the walls of the casing grooves 2, 3.

The disassembly of this nozzle structure may be somewhat difficult due to the fact that the turbine may be in service for a period of many years, during which time the retaining and sealing parts may tend to oxidize and grow slightly due to the elevated temperatures. The oxide surface coating may in effect "cement" the parts in place, making them very difficult to dislodge. Therefore to facilitate taking the nozzle structure apart, each retainer pin 19 is provided with a drilled hole 19a in each end thereof. This hole serves to center and guide the drill used to drill out the pin 19, since it is expected to be impossible to remove pin 19 otherwise. Similarly, the dowel 17 is provided with an axial hole the exterior end of which is threaded at 17b for the attachment of a suitable tool for pulling out the dowel. If necessary, the dowel pin 17 may also have to be drilled out, in which case hole 17a serves to guide the drill. Lastly, it will be noted that the key 14 is also provided with a longitudinal hole 14a an enlarged portion of which is threaded at 14b for the reception of a tool for pulling out the key. If the threads 14b should be stripped accidentally, the hole 14a may be tapped deeper for reception of the puller tool.

To reduce somewhat the tendency of the radial key 14 to stick in its keyway, the front and rear longitudinal surfaces of the key may be provided with parallel spaced grooves as shown at 14c in Figure 3. These grooves serve to reduce the contact area between the key and the respective casing portions, thus making it easier to remove the key.

The method of assembly of this improved nozzle plate retaining and sealing arrangement will be fairly apparent from the above description of the structure. The nozzle plate and the circumferential grooves 2, 3 in the casing for receiving the nozzle plate are first machined, then the rim seal keys 12 are peened in place and finish machined, the nozzle plate is "rolled" into the casing grooves, the radial keys 14 carefully fitted through access holes 16, the hole 18 drilled to cut off the protruding end of the key 14, after which the tapered dowel pin 17 is fitted and retained with pin 19.

Thus a comparatively few parts perform a very substantial number of retaining and fluid sealing functions. The result is a simple yet extremely rugged structure which may be expected to withstand extreme temperature and pressure conditions for many years without deterioration due to creep of highly loaded retaining parts, and yet capable of being disassembled for replacement or repair of the nozzle plate. This is important since, over a period of many years of operation, the nozzle blades may become eroded or the surfaces of the nozzle passages 6 coated with a deposit of boiler compounds or other impurities entrained in the motive fluid. Such deposits can in time alter the shape or size of the nozzle passages to such an extent that servicing becomes necessary.

While only one embodiment of the invention has been described specifically herein, it will be obvious to those familiar with the art that various modifications and substitutions of mechanical equivalents may be made. For instance, while the third key member 17 has been disclosed in the form of a round dowel pin, while the rim seal key 12 and radial key 14 are of square section, it is to be noted that any of the three key members may be either of round or suitable polygonal cross section. It is desired to cover by the appended claims all such changes as fall within the true spirit and scope of the invention.

What I claim as new and desire to secure by Letters Patent of the United States is:

1. In a nozzle structure for an elastic fluid turbine having a casing divided into at least two sections along a longitudinal plane through the axis of the rotor, the combination of turbine inlet casing portions defining radially spaced concentric grooves adapted to receive radially inner and outer peripheral portions of an arcuate nozzle plate member with substantial radial and axial clearance spaces between the nozzle plate and said casing grooves, the casing having at least one radially extending wall portion abutting the nozzle plate at one end of a nozzle arc, the nozzle plate having a radial wall portion separating adjacent nozzle arcs and adapted to abut said radial casing wall portion, a rim seal key member secured to the outer circumferential portion of the nozzle plate member and having an outer circumferential surface adapted to sealingly engage the circumferential surface of the outer casing groove, a tapered radially disposed key member occupying a keyway formed in the upstream portion of said radial nozzle plate wall, said radial key sealingly engaging the walls of the keyway and projecting axially therefrom to sealingly abut the adjacent surface of said radial casing wall portion, the radially inner portion of the turbine casing defining a radial access hole aligned with each nozzle plate keyway through which the radial key may be inserted in the respective keyways, the radially inner portion of the casing defining also an axially extending hole intersecting the access hole, a tapered dowel pin disposed in said axial hole with a circumferential portion of the dowel sealingly engaging an inner circumferential portion of the nozzle plate and the adjacent end of the radial key, and retainer pin means disposed transversely through an end portion of the dowel pin and in cooperating holes in the turbine casing.

2. In a nozzle structure for an elastic fluid turbine having a casing divided into at least two sections along longitudinal planes through the axis of the rotor, the combination of turbine inlet casing portions defining radially spaced concentric grooves adapted to receive radially inner and outer peripheral portions of an arcuate nozzle plate member with substantial radial and axial clearance spaces between the nozzle plate and said casing grooves, the casing having at least one radially extending wall portion abutting the nozzle plate at one end of a nozzle arc, and the nozzle plate having a radial wall portion adjacent one end of a nozzle arc and adapted to abut said radial casing wall portion, a first sealing key member secured to a peripheral portion of the nozzle plate member and having a circumferential surface adapted to sealingly engage the circumferential surface of the casing groove, a second key member occupying a radially extending key-way formed by the upstream portion of said radial nozzle plate wall and the abutting portion of said radial casing wall, said second radial key sealingly engaging the adjacent walls of said radial nozzle plate and casing portions to prevent cross-flow of motive fluid circumferentially through the axial clearance space between nozzle-plate and casing, the turbine casing defining a radial access hole aligned with the second key member through which the key may be inserted in the keyway, the turbine casing also defining an axially extending hole intersecting said access hole, a dowel pin disposed in the axial hole with a circumferential portion of the dowel sealingly engaging the adjacent peripheral portion of the nozzle plate and the adjacent end of the second key, and a retainer pin disposed transversely through an end portion of the dowel and occupying cooperating holes in the turbine casing.

3. In a nozzle structure for an elastic fluid turbine having a casing divided into at least two sections along longitudinal planes through the axis of the machine, the combination of turbine inlet casing portions defining radially spaced concentric grooves adapted to receive radially inner and outer peripheral portions of an arcuate nozzle plate member with substantial radial and axial clearance spaces between the nozzle plate and said casing grooves, the casing having at least one radially extending wall portion abutting the nozzle plate at one end of a nozzle arc, the nozzle plate having a cooperating radial wall portion adjacent one end of a nozzle arc and adapted to substantially abut said radial casing wall portion, a rim seal key member secured to the outer circumferential portion of the nozzle plate member and having an outer surface adapted to sealingly engage the circumferential surface of the outer casing groove, a tapered radially disposed key member occupying a keyway defined between the upstream portion of the radial nozzle plate wall and the adjacent portion of the radial casing wall, said radial key sealingly engaging the respective abutting walls of the radial nozzle plate and casing wall portions, the radially inner portion of the turbine casing defining a radial access hole aligned with said radial key-way through which the radial key may be inserted, the radially inner portion of the turbine casing defining also an axially extending hole intersecting the access hole, a tapered dowel pin disposed in the axial hole with a circumferential portion thereof sealingly engaging an inner circumferential portion of the nozzle plate and the adjacent end of the radial key, and retainer means for securing the dowel pin in the casing.

4. In a nozzle structure for an elastic fluid turbine having a casing divided into two sections along a longitudinal plane through the axis of the machine, the combination of turbine inlet casing portions defining radially spaced concentric grooves adapted to receive radially inner and outer peripheral portions of an arcuate nozzle plate member with substantial clearance space between the nozzle plate and said casing grooves, the inlet casing and nozzle plate each having at least one radially extending wall portion in substantially abutting relation with each other, the nozzle plate having also a peripheral portion with an outer surface adapted to sealingly engage the circumferential surface of one of said casing grooves, a radially disposed key member occupying a keyway defined between said radially extending portions of nozzle plate and casing respectively, said radial key sealingly engaging the respective abutting walls of said radial nozzle plate and casing wall portions to prevent cross-flow of motive fluid circumferentially through the clearance between nozzle plate and casing, the turbine casing defining a radial access hole aligned with said radial keyway through which the radial key may be inserted, the turbine casing defining also an axially extending hole intersecting said access hole, second key means disposed in said axial hole with a portion of the surface thereof sealingly engaging peripheral portion of the nozzle plate and the adjacent end of the radial key, and retainer means for securing said second key in the casing.

5. In a nozzle structure for an elastic fluid turbine having a casing divided into two sections along a longitudinal plane through the axis of the machine, the combination of turbine inlet casing portions defining radially spaced concentric grooves adapted to receive radially inner and outer peripheral portions of an arcuate nozzle-plate member with substantial clearance space between nozzle-plate and casing grooves, said inlet casing and nozzle plate each having at least one radially extending wall portion in substantially abutting relation with each other, a first radially disposed key member occupying a keyway defined between said radially extending portions of nozzle-plate and casing respectively, said first key sealingly engaging the respective abutting walls of the nozzle plate and casing to prevent cross-flow of motive fluid circumferentially through the clearance between nozzle-plate and casing, the turbine casing having a radial access hole aligned with the radial keyway through which said first key may be inserted, the turbine casing defining also an axially extending hole intersecting said access hole, and second key means disposed in said axial hole with a portion of the surface thereof sealingly engaging a peripheral portion of the nozzle-plate and the adjacent end of said first radial key.

ALEXANDER L. ENGLISH.

No references cited.